United States Patent [19]

Yabe et al.

[11] Patent Number: 4,875,986

[45] Date of Patent: Oct. 24, 1989

[54] METHOD FOR THE PREPARATION OF POLYKIS-AZOBENZENES

[75] Inventors: Akira Yabe; Akihiko Ouchi; Hiroshi Moriyama, all of Tsukuba; Etsuro Masuda, Suginami, all of Japan

[73] Assignee: Japan as represented by Director General of Agency of Industrial Science and Technology, Tokyo, Japan

[21] Appl. No.: 162,728

[22] Filed: Mar. 1, 1988

[30] Foreign Application Priority Data

Mar. 13, 1987 [JP] Japan .................................. 62-58236

[51] Int. Cl.$^4$ ............................................. B01J 19/00
[52] U.S. Cl. ............................. 204/157.6; 204/157.61
[58] Field of Search ......................... 204/157.6, 157.61

[56] References Cited

PUBLICATIONS

Chemical Abstracts, vol. 77, No. 18, 114923y.
Hayakawa et al., "Photochemical Isomerization of Azobenzene for Long-Term Storage of Solar Energy", Reports of the Government Industrial Research Inst., vol. 34, Iss. 10, (1985).

Primary Examiner—John F. Niebling
Assistant Examiner—Isabelle Rodriquez
Attorney, Agent, or Firm—Wenderoth, Lind & Ponack

[57] ABSTRACT

Polykis-azobenzenes as an important coloring material can be prepared by irradiating diazidobenzene or a derivative thereof with ultraviolet light in the form of a solution in an organic solvent, in the form of a thin film or fine powder or in the form of vapor under reduced pressure.

7 Claims, 1 Drawing Sheet

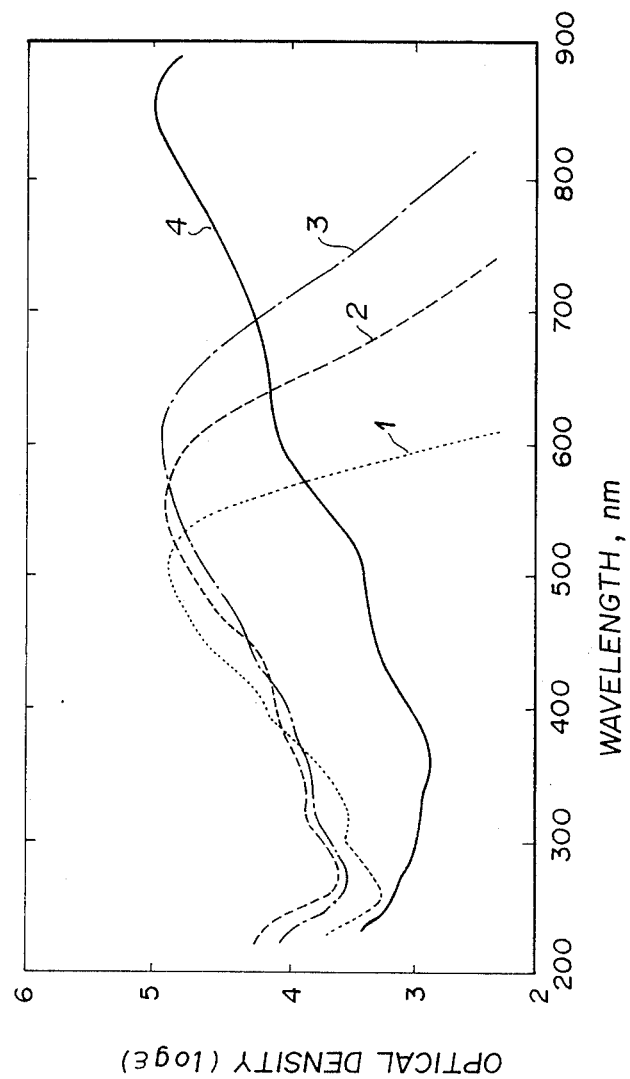

METHOD FOR THE PREPARATION OF POLYKIS-AZOBENZENES

BACKGROUND OF THE INVENTION

The present invention relates to a method for the preparation of polykis-azobenzenes or, more particularly, to a method for the preparation of polykis-azobenzenes by the photochemical reaction of a substituted or unsubstituted 1,4-diazidobenzene.

Polykis-azobenzenes or polymeric compounds of azobenzene are each an important coloring matter and represented by the general formula

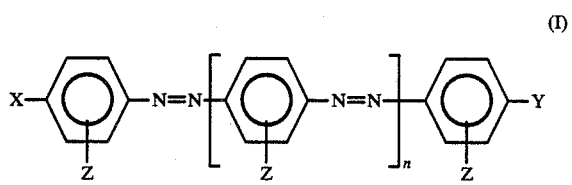

(I)

in which the subscript n is a positive integer and X, Y and Z are each a hydrogen atom, a halogen atom or a group selected from the class consisting of alkyl groups, alkoxy groups, acyl groups, carboxyl group, nitro group, amino group, azido group, cyano group and phenyl group as a substituent on the benzene ring. The method for the synthetic preparation of various kinds of derivatives thereof has been the subject matter of extensive investigations hitherto undertaken. In recent years, polykis-azobenzenes are highlighted as a liquid crystal material or an organic electroconductive material so that it is eagerly desired to develop an efficient method for the preparation of these polykis-azobenzenes.

The method for the preparation of polykis-azobenzenes known in the prior art utilizes a starting material which is a 1,4-di(substituted) derivative of benzene with a diazonium salt, nitro group, nitroso group, amino group and the like as the substituent groups. The prior art method utilizing these starting materials is industrially not advantageous because the process involves a sequence of a number of steps of unit reactions consequently with a low yield of the desired product. In particular, it is an extremely difficult matter to synthesize polykis-azobenzenes of a relatively high molecular weight having, for example, a value of 3 or larger of the subscript n in the above given general formula (I) in an industrially desirable yield.

SUMMARY OF THE INVENTION

The present invention accordingly has an object to provide a novel and efficient method for the synthetic preparation of polykis-azobenzenes in an industrially acceptable high yield.

Thus, the method of the present invention for the preparation of polykis-azobenzenes comprises irradiating a substituted or unsubstituted 1,4-diazidobenzene with light.

BRIEF DESCRIPTION OF THE DRAWING

The FIGURE shows the absorption spectra of several polykis-azobenzenes in the ultraviolet to visible wavelength region of light.

DETAILED DESCRIPTION OF THE PREFERRED EMBODIMENTS

With an object to develop an industrially advantageous method for the preparation of polykis-azobenzenes, the inventors have continued extensive investigations on the photochemical reactivity of azido compounds and the characteristics of nitrene as an intermediate produced by the reaction when an azido compound is irradiated with light as well as the photochemical phenomena in a matrix at an extremely low temperature and laser-photochemical phenomena. The investigations have led to a discovery that the desired polykis-azobenzenes can be produced efficiently when means based on laser photochemistry and low temperature matrix photochemistry are applied to a 1,4-diazidobenzene or as derivative thereof as the starting material of a photochemical reaction.

The starting material used in the inventive method is 1,4-diazidobenzene or a substituted compound thereof. These compounds can be easily synthesized from an inexpensive starting compound with good availability such as 1,4-diaminobenzene, 1,4-dinitrobenzene and the like. These starting compounds are susceptible to a photochemical reaction with high efficiency when they are irradiated with light, in particular, having an energy distribution with high intensity in the wavelength region from 190 nm to 315 nm. Known light sources emitting light in such a wavelength region include, for example, low-, medium- and high-pressure mercury lamps, ArF excimer laser, KrCl excimer laser, KrF excimer laser, XeCl excimer laser and the like, A particularly high efficiency can be obtained for the synthesis of the desired polykis-azobenzenes when irradiation of the starting compound is performed by use of an excimer laser strongly emitting light in the ultraviolet region.

Usually, 1,4-diazidobenzene or a derivative thereof is dissolved in a suitable organic solvent such as benzene, ethyl alcohol, methyl alcohol, ethyl ether, hexane, cyclohexane and the like and the solution is irradiated with light in a vessel through a window made of fused quartz glass from outside. The solution under irradiation with light is kept at room temperature or at a decreased temperature not so low to cause solidification of the solution. When substantially all of the reactant in the irradiated solution has been reacted, the desired products of polykis-azobenzenes having different degrees of polymerization can be isolated and fractionated from the reaction mixture by the method of solvent extraction.

Alternatively, the photochemical reaction of 1,4-diazidobenzene or a derivative thereof can proceed even in the solid state. For example, 1,4-diazidobenzene is dissolved in a small volume of a good solvent such as acetone and the solution is spread over a quartz glass plate and dried by evaporating the solvent to give a thin film of 1,4-diazidobenzene which is then irradiated with ultraviolet light to give the desired polykis-azobenzenes. Further alternatively, the photochemical reaction can proceed in the gaseous phase. For example, 1,4-diazidobenzene is vaporized at room temperature in an atmosphere of a reduced pressure by utilizing a vacuum line and the vapor is irradiated with light from outside of the pipe line of quartz glass through which the vapor is flowing to collect the polykis-azobenzenes as the product of the photochemical reaction on the surface of a substrate plate chilled at a low temperature.

As understood from the above description, the method of the present invention is very advantageous for the preparation of polykis-azobenzenes because of: inexpensive and readily available starting materials, very simple reaction procedure, that is only by irradiation of the starting material with light and very high efficiency and yield of the desired product obtained within a short period of time. In particular, the method of the invention is advantageous for the preparation of polykis-azobenzenes having a relatively high molecular weight which can be obtained in the prior art method is an extremely low yield after undertaking a number of unit reactions in sequence.

In the following, the method of the present invention is described in more detail by way of examples.

EXAMPLE 1

A 2 ml portion of a solution prepared by dissolving 160 mg of 1,4-diazidobenzene in 100 ml of n-hexane was taken in a quartz glass-made cell of 1 cm by 1 cm cross section and irradiated at room temperature with 20 shots of pulsewise emission at a wavelength of 248 nm from a KrF excimer laser having a pulse width of 10 ns and an intensity of 70 mJ/pulse through the window of the cell. While volume of the above prepared solution of 160 mg of 1,4-diazidobenzene was subjected portion by portion to the same photochemical procedures as described above. The portions of the solution after irradiation with light were combined together and the solution was freed from the solvent by evaporation at room temperature to dryness. The powdery residue was washed successively with methylene chloride and tetrahydrofuran followed by drying to give 80 mg of a deep violet powder. The yield was about 77% of the theoretical value assuming that this powder was polykis-azobenzene.

This product was almost insoluble in any solvents except for concentrated sulfuric acid so that the molecular weight thereof could not be determined. The results of the infrared absorption spectrophotometry, NMR spectrometry and spectrophotometry in the ultraviolet visible region shown below, however, led to a conclusion that this product presumably had a skeleton of polykisazobenzenes having a molecular weight higher than that of p,p',p''-tetrakis-azobenzene of the structural formula

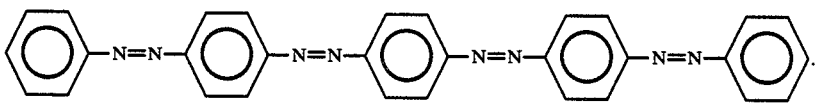

(1) Infrared absorption spectrum by the KBr disc method 1696; 1495; 1416; 1310; 1280; 1205; and 860 cm$^{-1}$ (2) $^1$H-NMR spectrum in $D_2SO_4$ solution 10.3 ppm, ringlet, for the equivalent H atoms in

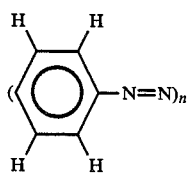

(3) Ultraviolet-visible absorption spectrum in $D_2SO_4$ solution shown by the curve 4 in the accompanying drawing together with the curves 1, 2 and 3 for p-disazobenzene, p,p'-trisazobenzene and p,p',p''-tetrakisazobenzene, respectively

EXAMPLE 2

A solution prepared by dissolving 320 mg of 1,4-diazidobenzene in 200 ml of benzene was taken in the reaction vessel of an apparatus made of Pyrex glass for internal irradiation with light and the photochemical reaction was performed for 10 minutes. The reaction mixture was freed from benzene by evaporation at room temperature and the residue was washed with tetrahydrofuran to remove low-molecular products leaving 40 mg of a deep violet powder. A solution of this product in $D_2SO_4$ had an absorption spectrum in the ultraviolet to visible region substantially identical with the curve 1 obtained in Example 1.

EXAMPLE 3

A solution prepared by dissolving 16 mg of 1,4-diazidobenzene in 2 ml of acetone was spread over a quartz glass-made plate of 4 cm by 1 cm dimensions and acetone was evaporated to dryness to leave a thin film of 1,4-diazidobenzene which was then irradiated with 30 shots of ultraviolet light emitted from an ArF excimer laser to effect the photochemical reaction. The thin film after the irradiation was washed with tetrahydrofuran to give a deep violet powder having substantially the same properties as the product obtained in Example 1.

EXAMPLE 4

1,4-Diazidobenzene was vaporized at 22° C. in an atmosphere of reduced pressure connected to a vacuum line and the vapor of the 1,4-diazidobenzene flowing through a quartz glass-made pipe line was irradiated in a perpendicular direction with ultraviolet light from a high-pressure mercury lamp. The intermediate produced by the irradiation with light was deposited on a quartz glass plate chilled at 80 K. by means of a freezer system. The temperature of the quartz glass plate was brought back to room temperature by interrupting the freezer system and the deep violet thin film deposited on the quartz glass plate was scraped off and recovered after releasing the vacuum system to the open air. The deep violet powder thus obtained had substantially the same properties after washing with tetrahydrofuran as the product obtained in Example 1.

EXAMPLE 5

1,4-Diazidobenzene was dissolved in several different solvents in a concentration of $1 \times 10^{-3}$ mole/liter and the solutions were each irradiated with one of the ultraviolet light sources indicated in Table 1 below. The solutions after the irradiation with ultraviolet light were subjected to the spectrophotometric measurement in the ultraviolet to visible region to give the wavelengths at the maximum of absorption as shown in Table 1. These results indicate the existence of polykis-azobenzenes having a relatively low molecular weight and consequently relatively high solubility with reference to: H. Dahn and H. V. Castelmur, Helvetica Chimica Acta, volume 80, page 638 (1953).

TABLE 1

| Light source | Solvent | Wavelength, nm, at the absorption maximum after irradiation |
| --- | --- | --- |
| High-pressure mercury lamp, 500 watts | Cyclohexane | 360 |
| | Hexane | 350 |
| | Methyl alcohol | 310, 380 |
| | Benzene | 400 |
| Low-pressure mercury lamp, 10 watts | Cyclohexane | 360 |
| KrF excimer laser, 248 mm | Hexane | 420 |

What is claimed is:

1. A method for the preparation of polykis-azobenzenes which comprises irradiating a substituted or unsubstituted 1,4-diazidobenzene with light.

2. The method for the preparation of polykis-azobenzenes as claimed in claim 1 wherein 1,4-diazidobenzene is irradiated with light in an organic solvent.

3. The method for the preparation of polykis-azobenzenes as claimed in claim 1 wherein 1,4-diazidobenzene is irradiated with light in the form of a thin film or in the form of a finely divided powder.

4. The method for the preparation of polykis-azobenzenes as claimed in claim 1 wherein 1,4-diazidobenzene is irradiated with light in the form of a vapor under reduced pressure.

5. The method for the preparation of polykis-azobenzenes as claimed in claim 1 wherein the light is ultraviolet light having a wavelength in the range from 190 nm to 315 nm.

6. The method for the preparation of polykis-azobenzenes as claimed in claim 2 wherein the organic solvent is selected from the group consisting of benzene, methyl alcohol, ethyl alcohol, diethyl ether, hexane and cyclohexane.

7. The method for the preparation of polykis-azobenzene as claimed in claim 1 wherein the light is emitted from an excimer laser.

* * * * *